United States Patent
Nagai et al.

(10) Patent No.: US 10,656,271 B2
(45) Date of Patent: May 19, 2020

(54) TIME-OF-FLIGHT DISTANCE MEASUREMENT DEVICE AND METHOD FOR SAME

(71) Applicant: DENSO CORPORATION, Kariya, Aichi-pref. (JP)

(72) Inventors: Toshiaki Nagai, Kariya (JP); Kenichi Yanai, Kariya (JP)

(73) Assignee: DENSO CORPORATION, Kariya (JP)

( * ) Notice: Subject to any disclaimer, the term of this patent is extended or adjusted under 35 U.S.C. 154(b) by 656 days.

(21) Appl. No.: 15/318,706

(22) PCT Filed: Nov. 3, 2015

(86) PCT No.: PCT/JP2015/005511
§ 371 (c)(1),
(2) Date: Dec. 14, 2016

(87) PCT Pub. No.: WO2016/072089
PCT Pub. Date: May 12, 2016

(65) Prior Publication Data
US 2017/0115393 A1    Apr. 27, 2017

(30) Foreign Application Priority Data
Nov. 6, 2014   (JP) .................. 2014-226069

(51) Int. Cl.
*G01C 3/08* (2006.01)
*G01S 17/10* (2020.01)
(Continued)

(52) U.S. Cl.
CPC ............ *G01S 17/10* (2013.01); *G01S 7/4861* (2013.01); *G01S 7/4865* (2013.01); *G01S 7/4868* (2013.01)

(58) Field of Classification Search
CPC .............................. G01S 7/4865; G01S 7/483
(Continued)

(56) References Cited

U.S. PATENT DOCUMENTS

| 4,080,574 A * | 3/1978 | Loosemore ............. G01F 1/667 327/19 |
| 2004/0135992 A1 * | 7/2004 | Munro .................... G01S 7/483 356/4.01 |

(Continued)

FOREIGN PATENT DOCUMENTS

JP    2010-25906 A    2/2010

OTHER PUBLICATIONS

Möller et al., "Robust 3D Measurement with PMD Sensors", PMDTechnologies GmbH, Am Eichenhang 50, D-57076, Germany. (Discussed on pp. 1-3 of the specification).

*Primary Examiner* — Samantha K Abraham
(74) *Attorney, Agent, or Firm* — Posz Law Group, PLC

(57) ABSTRACT

A light emitting element emits a modulated light modulated in a pattern having a repetitive period toward a space. A driving unit drives the light emitting element. A light receiving element distributes charges corresponding to an incident light containing a reflected light obtained by reflecting the modulated light on an object to storage capacitors and stores the distributed charges. A control unit controls an exposure of the light receiving element. A signal processing unit measures a distance to the object by using a value sampled by the light receiving element. The control unit controls the exposure of the light receiving element to give a sensitivity to at least one high-order harmonic. The signal processing unit linearly combines a component of a fundamental wave with a component of the at least one high-order harmonic to measure the distance to the object.

20 Claims, 17 Drawing Sheets

(51) Int. Cl.
*G01S 7/4865* (2020.01)
*G01S 7/4861* (2020.01)
*G01S 7/486* (2020.01)

(58) Field of Classification Search
USPC ................................................ 356/3.01–5.15
See application file for complete search history.

(56) References Cited

U.S. PATENT DOCUMENTS

| | | |
|---|---|---|
| 2011/0157354 A1 | 6/2011 | Kawahito |
| 2011/0194099 A1 | 8/2011 | Kamiyama |
| 2012/0205723 A1* | 8/2012 | Suzuki .................... G01S 17/89 257/215 |
| 2013/0228691 A1 | 9/2013 | Shah |
| 2015/0262802 A1* | 9/2015 | Makarov ................ H01J 9/022 250/281 |
| 2015/0281618 A1* | 10/2015 | Saito ....................... H04N 9/31 348/303 |
| 2017/0199272 A1* | 7/2017 | Takaoka ................. G01S 17/10 |

\* cited by examiner

| NO. | LIGHT EMISSION WAVEFORM duty | PEAK VALUE | THE NUMBER OF PHASES | DRIVE WAVEFORM | INTEGRATION PERIOD | REMARKS |
|---|---|---|---|---|---|---|
| A | 50% | ×1.0 | 4 | "0" ABSENT | ENTIRE PERIOD | COMPARATIVE EXAMPLE |
| B | 25% | ×2.0 | 4 | "0" ABSENT | ENTIRE PERIOD | |
| C | 50% | ×2.0 | 4 | "0" ABSENT | HALF | BURST OPERATION |
| D | 25% | ×2.0 | 8 | "0" PRESENT | ENTIRE PERIOD | PRESENT DISCLOSURE |

TIME-OF-FLIGHT DISTANCE MEASUREMENT DEVICE AND METHOD FOR SAME

CROSS REFERENCE TO RELATED APPLICATION

This application is the U.S. national stage of International Patent Application No. PCT/JP2015/005511 filed on Nov. 3, 2015 and is based on Japanese Patent Application No. 2014-226069 filed on Nov. 6, 2014, the disclosures of which are incorporated herein by reference.

TECHNICAL FIELD

The present disclosure relates to a time-of-flight distance measurement device and a method for the device, which emit a modulated light modulated in a pattern having a repetitive period toward a space, receive an incident light containing a reflected light obtained by reflecting the modulated light on an object to distribute charges to multiple storage capacitors and accumulate the distributed charges, and measure a distance from the subject device to the object by using a sampled value.

BACKGROUND ART

As a device for measuring a distance from a subject device to an object without contact, a time of flight (TOF: time of flight) distance measurement device is provided. The time-of-flight distance measurement device emits a modulated light (distance measuring light) modulated in a pattern having a repetitive period toward a space, and receives an incident light containing a reflected light obtained by reflecting the modulated light on an object. The time-of-flight distance measurement device distributes charges corresponding to the received incident light to multiple storage capacitors and accumulates the distributed charges, and measures a distance from the subject device to the object by using a sampled value (for example, refer to Patent Literatures 1 to 4).

In the time-of-flight distance measurement device, a distance error is required to be reduced. As methods for reducing the distance error, there are a method of suppressing a phase angle error, that is, increasing a signal-to-noise ratio (SNR: signal-to-noise ratio) and a method of increasing a modulation frequency. In a method of increasing the SNR, a light emission power is increased in order to increase a signal component, an optical filter is used to reduce the noise component, and the number of integrations is increased to increase the SNR. As a conventional art for increasing the light emission power, a technique for emitting a light in a burst mode is disclosed (for example, refer to Non Patent Literature 1).

PRIOR ART LITERATURES

Patent Literature

Patent Literature 1: Japanese Patent No. 5579893
Patent Literature 2: JP-A-2010-96730
Patent Literature 3: Japanese Patent No. 5585903
Patent Literature 4: JP-A-2010-25906

Non Patent Literature

Non Patent Literature 1: Moller, T., Kraft, H., Frey, J., Albrecht, M., and Lange, R., 2005. Robust 3D Measurement with PMD Sensors. In Proceedings of the 1st Range Imaging Research Day at ETH Zurich.

SUMMARY

However, in a method of increasing the light emission power, attention is paid to a power consumption and a heat generation caused by the power consumption. In the method using the optical filter, the optical filter cannot be set to be narrower than a wavelength width on an emission side. In a method of increasing the number of integrations, a frame rate is reduced. In a method of increasing a modulation frequency, since a distance at which a phase rotation (aliasing) occurs is shorter as the frequency is higher, a long distance cannot be measured without performing the multiple exposures.

The present disclosure has been made in view of the above issues, and an object of the present disclosure is to provide a time-of-flight distance measurement device and a method for the device, which are capable of appropriately reducing a distance error without increasing a light emission power, using an optical filter, increasing the number of integrations, and increasing a modulation frequency.

A first aspect of the present disclosure is a time-of-flight distance measurement device. In the time-of-flight distance measurement device, a light emitting element is configured to emit a modulated light modulated in a pattern having a repetitive period toward a space. A driving unit is configured to drive the light emitting element. A light receiving element is configured to distribute charges corresponding to an incident light containing a reflected light obtained by reflecting the modulated light on an object to a plurality of storage capacitors and to store the distributed charges. A control unit is configured to control an exposure of the light receiving element. A signal processing unit is configured to measure a distance to the object by using a value sampled by the light receiving element. The control unit is configured to control the exposure of the light receiving element to give a sensitivity to at least one high-order harmonic, and The signal processing unit is configured to linearly combine a component of a fundamental wave with a component of the at least one high-order harmonic to measure the distance to the object.

According to the first aspect, in calculation of the distance to the object, because the component of the fundamental wave is linearly combined with at least one high-order harmonic, the distance error can be appropriately reduced more than a case in which the distance is measured on the basis of only the component of the fundamental wave as much as the consideration of the high-order harmonic component. In that case, there is no need to increase the light emission power in order to increase the signal component, there is no need to use an optical filter in order to reduce a noise component, there is no need to increase the number of integrations, and there is no need to increase the modulation frequency. In other words, the distance error can be appropriately reduced without increasing the light emission power, using the optical filter, increasing the number of integrations, and increasing the modulation frequency.

A second aspect of the present disclosure is a time-of-flight distance measurement method for calculating a distance to an object. The time-of-flight distance measurement method comprises emitting a modulated light modulated in a pattern having a repetitive period from a light emitting element toward a space; and controlling an exposure of the light receiving element to give a sensitivity to at least one high-order harmonic, distributing charges corresponding to an incident light containing a reflected light obtained by reflecting the modulated light on an object to a plurality of storage capacitors of the light receiving element, and storing the distributed charges. It further comprises linearly combining a component of a fundamental wave sampled by the light receiving element with a component of the at least one high-order harmonic to measure the distance to the object.

According to the second aspect, as in the first embodiment, in the calculation of the distance to the object, the component of the fundamental wave is linearly combined with the component of at least one high-order harmonic. For that reason, the distance error can be appropriately reduced more than a case in which the distance is calculated on the basis of only the component of the fundamental wave as much as the consideration of the high-order harmonic component. In that case, there is no need to increase the light emission power in order to increase the signal component, there is no need to use an optical filter in order to reduce a noise component, there is no need to increase the number of integrations, and there is no need to increase the modulation frequency. In other words, the distance error can be appropriately reduced without increasing the light emission power, using the optical filter, increasing the number of integrations, and increasing the modulation frequency.

DESCRIPTION OF EMBODIMENTS

Figure 1:
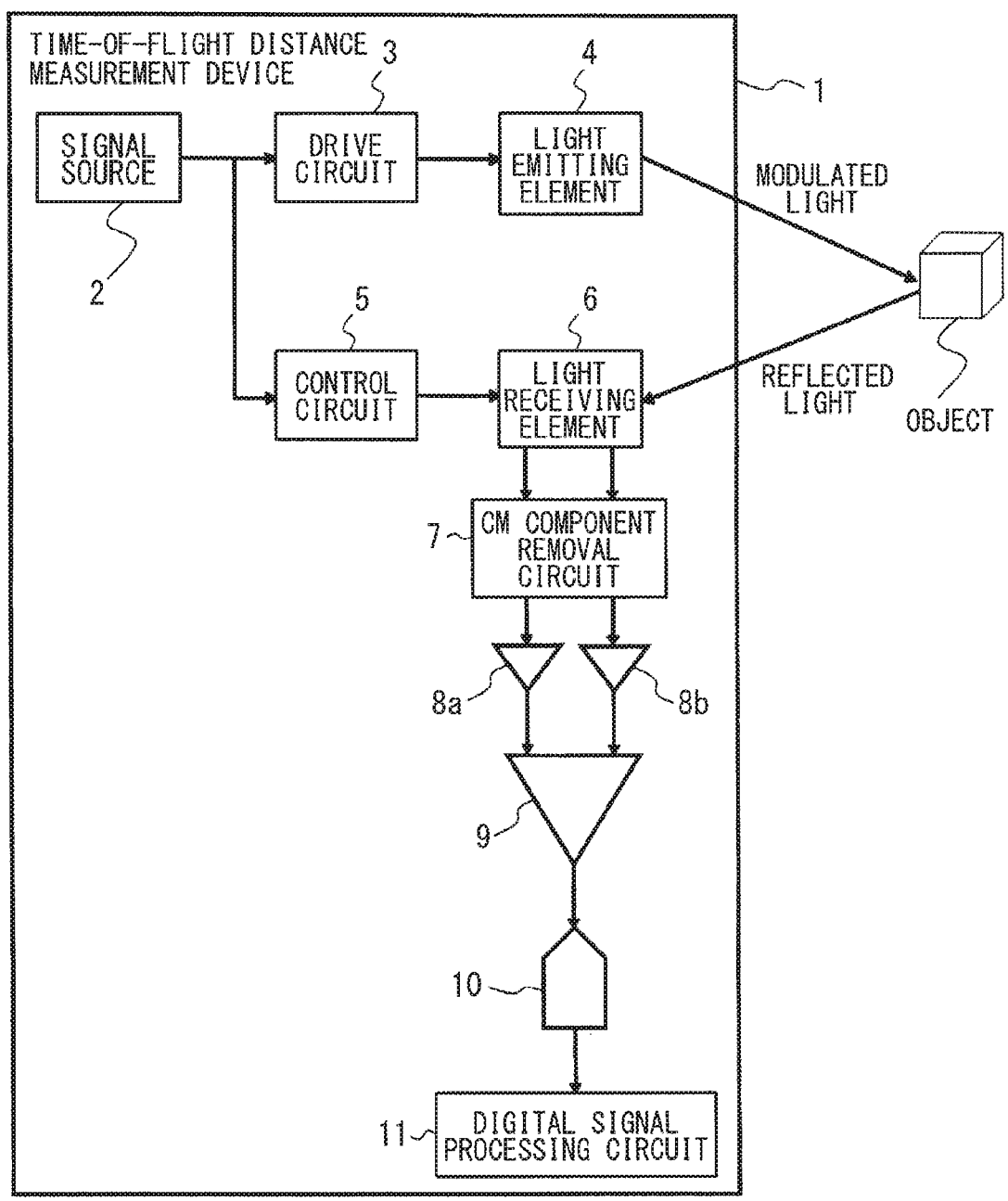
FIG. 1 is a functional block diagram illustrating one embodiment of the present disclosure.

Hereinafter, an embodiment, in which a time-of-flight distance measurement device and a time-of-flight distance measurement method according to the present disclosure are applied to, for example, a vehicle, will be described with reference to the drawings. An object, a distance of which from the subject device is measured, is, for example, a person, a vehicle, a wall, and the like. A time-of-flight distance measurement device 1 includes a signal source 2, a drive circuit 3 (drive unit), a light emitting element 4, a control circuit 5 (control unit), a light receiving element 6, a CM (common mode) component removal circuit 7, buffers 8a, 8b, a differential detection circuit 9, an AD conversion circuit 10, and a digital signal processing circuit 11 (signal processing unit).

The signal source 2 outputs a drive signal to the drive circuit 3 and the control circuit 5 to establish a synchronization between the light emitting element 4 and the light receiving element 6 and controls an exposure of the light receiving element 6 in synchronization with a modulated light emitted from the light emitting element 4. The drive signal output from the signal source 2 may be a rectangular pulse (normally several to several tens MHz) for driving the light emitting element 4 and the light receiving element 6 or may be only a synchronization pulse. The light emitting element 4 is an LD (laser diode) or an LED (light emitting diode) which emits, for example, an infrared ray as a modulated light. The light receiving element 6 is an image sensor using a process of, for example, a CMOS (complementary metal oxide semiconductor) or a CCD (charge coupled device).

Figure 2:
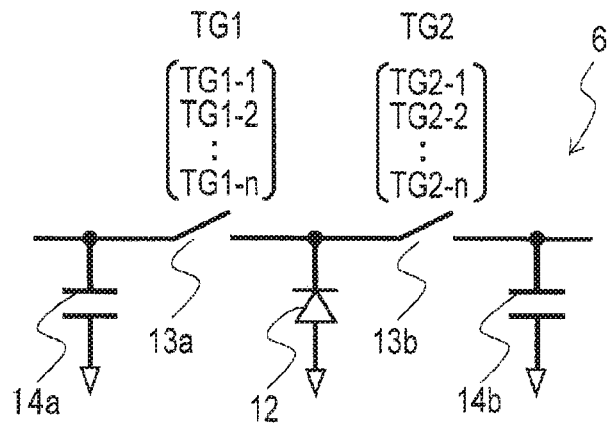
FIG. 2 is a diagram illustrating a configuration of a light receiving element (two-capacitor configuration)

As illustrated in FIG. 2, the light receiving element 6 includes a PD (photodiode) 12, two modulation switches 13a, 13b, and two storage capacitors 14a, 14b. The two modulation switches 13a and 13b include, for example, MOS devices such as MOS transistors and transfer gates, devices having a CCD structure, and the like. The two storage capacitors 14a and 14b include, for example, capacitive elements such as a MOS, a CCD, and an MIM (metal insulator metal), wirings, parasitic capacitors of a PN junction, and the like. The light receiving element 6 drives the modulation switches 13a and 13b according to control signals (gate signals) TG1 and TG2, distributes photoelectrons generated by the received incident light to the storage capacitors 14a and 14b, and outputs a signal indicative of a charge amount of the distributed photoelectron to the CM component removal circuit 7. Since the control signals TG1 and TG2 are signals synchronized with the modulated light, the charge amount of the photoelectron distributed to the storage capacitors 14a and 14b is changed according to a distance from the subject device to the object. In FIG. 2, the two storage capacitors 14a and 14b are illustrated, but three or more storage capacitors may be provided.

When a background light of a level that cannot be ignored with respect to the emitted modulated light is present, the CM component removal circuit 7 avoids the saturation by using the configuration of pixels. As a method for removing the CM component, various techniques are disclosed in the prior art literatures. For example, the techniques are disclosed in U.S. Pat. No. 6,919,549B2, German Patent Publication No. 102005056774A1, European Patent Publication No. 1622200A1, and the like. The differential detection circuit 9 detects a difference between signals input from the CM component removal circuit 7 through the buffers 8*a* and 8*b*, and outputs a signal corresponding to the detected difference to the AD conversion circuit 10. The buffers 8*a* and 8*b* are configured with, for example, a source follower circuit from the viewpoint of simplification. The differential detection circuit 9 is configured with, for example, a differential amplifier.

The AD conversion circuit 10 converts the signal input from the differential detection circuit 9 from an analog signal into a digital signal and outputs the digital signal to the digital signal processing circuit 11. The digital signal processing circuit 11 subjects the signal input from the AD conversion circuit 10 to digital signal processing, calculates the charge amount of photoelectrons distributed to the storage capacitors 14*a* and 14*b*, and calculates a distance from the subject device to the object (measures a distance).

Figure 3:
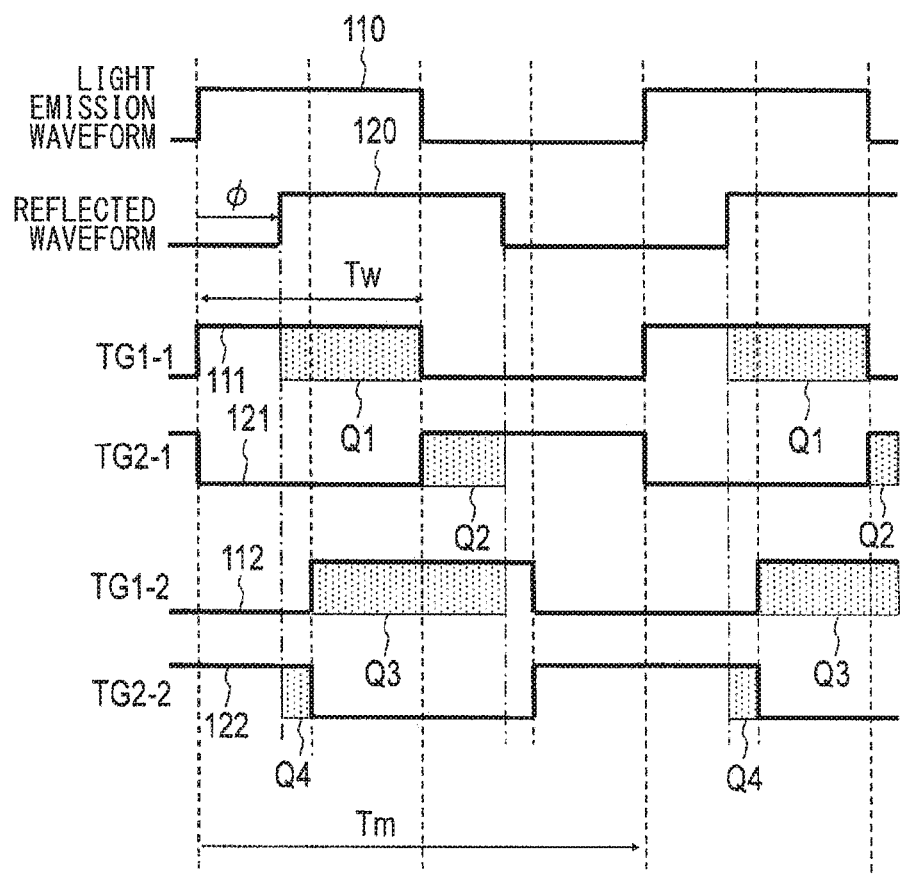
FIG. 3 is a diagram illustrating a sequence of four phases.

FIG. 3 illustrates a sequence (modulation cycle: Tm, exposure period: Tw) when the light receiving element 6 is driven by four phases with the duty of the light emission waveform being 50%. The waveform (light emission waveform 110) of the modulated light emitted from the light emitting element 4 is modified with a rectangular wave synchronized with the control signals TG1 and TG2. FIG. 3 illustrates a case in which the light is modulated with the rectangular wave, note that, the light may be modulated with a waveform of a sine wave, a triangle wave, a pseudorandom sequence, or the like. Since the waveform (reflected waveform 120) of the reflected light obtained by reflecting the modulated light on the object has a time difference to the light emission waveform 110, the waveform is delayed from the light emission waveform 110 by a phase difference $\phi$. On the other hand, the control signals TG1 and TG2 are driven by rectangular waves different in phase from each other by 180 degrees. The digital signal processing circuit 11 acquires information (voltage value subjected to charge-to-voltage conversion) on the generated light charges Q1 and Q2 after the sequences driven by control signals TG1-1 and TG2-1 (drive waveforms 111, 121) has been repeated in cycles of about several tens to hundreds of thousands times. Thereafter, the digital signal processing circuit 11 acquires information on the generated light charges Q3 and Q4 after the sequence driven by the control signals TG1-2 and TG2-2 (drive waveforms 112, 122) has been repeated in the cycles of several tens to hundreds of thousands times, similarly. The digital signal processing circuit 11 calculates an estimation value $\theta$ of the phase difference $\phi$ (hereafter referred to as "phase difference $\theta$") from the acquired Q1 to Q4 by using a discrete Fourier transform (DFT) through the following arithmetic expression (1).

$$\theta = \tan-1[(Q1-Q3)/(Q2-Q4)] \quad (1)$$

The arithmetic expression (1) is used to calculate the phase difference based on the above four samplings. Similarly, in a general N-phase, the phase difference $\theta$ can be calculated through the following arithmetic expression (2).

$$\theta = \tan-1[(\Sigma Qk^*\sin(2\pi/N^*k))/(\Sigma Qk^*\cos(2\pi/N^*k))] \quad (2)$$

Figure 4:
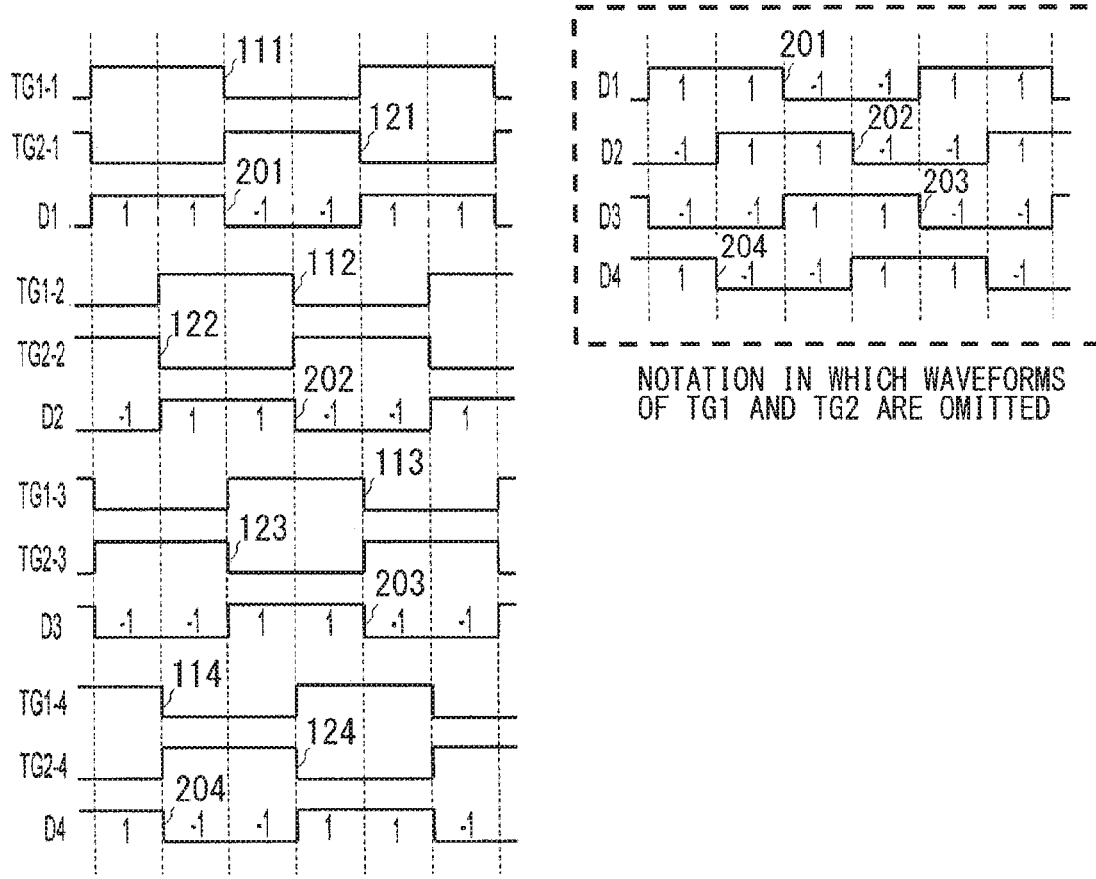
FIG. 4 is a diagram illustrating a sequence of a differential output.

FIG. 4 illustrates a sequence of a differential output. The differential detection circuit 9 repeats the combination of control signals TG1 and TG2, for example, the control signals TG1-1 (drive waveform 111) and TG2-1 (drive waveform 121) by a few tens to hundreds of thousands times to generate the digital value D1 (201). Likewise, the differential detection circuit 9 generates a digital value D2 (202) from the control signals TG1-2 (drive waveform 112) and TG2-2 (drive waveform 122), generates a digital value D3 (203) from control signals TG1-3 (drive waveform 113) and TG2-3 (drive waveform 123), and generates a digital value D4 (204) from control signals TG1-4 (drive waveform 114) and TG2-4 (drive waveform 124). In that case, the differential detection circuit 9 outputs the digital values D1 to D4 as values from which the DC component is removed. When the control signal TG1 is "H" and the control signal TG2 is "L", "1" (first state) is allocated to the respective digital values D1 to D4, and when the control signal TG1 is "L" and the control signal TG2 is "H", "−1" (second state) is allocated to the respective digital values D1 to D4. In other words, the states of the control signals TG1 and TG2 are uniquely determined according to whether the value is "1" or "−1" in the waveform of Dx. Incidentally, since Dx is a signal indicative of a difference between the two storage capacitors 14*a* an 14*b* as described above, the AD conversion circuit 10 outputs a signal that has been subjected to calculation corresponding to a numerator or a denominator of the arithmetic expression (1) described above.

Figure 5:
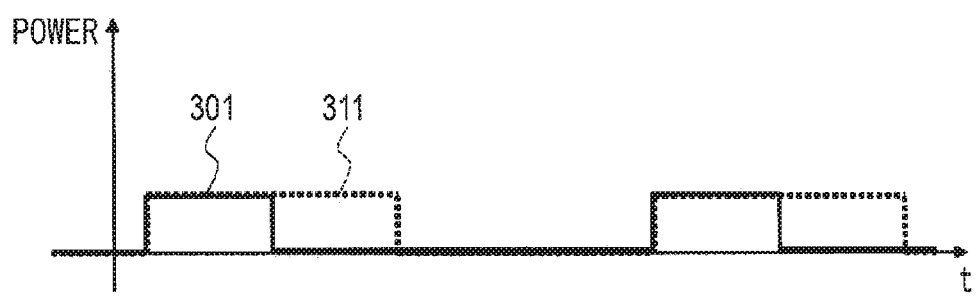
FIG. 5 is a diagram illustrating a light emission waveform (No. 1)
Figure 6:
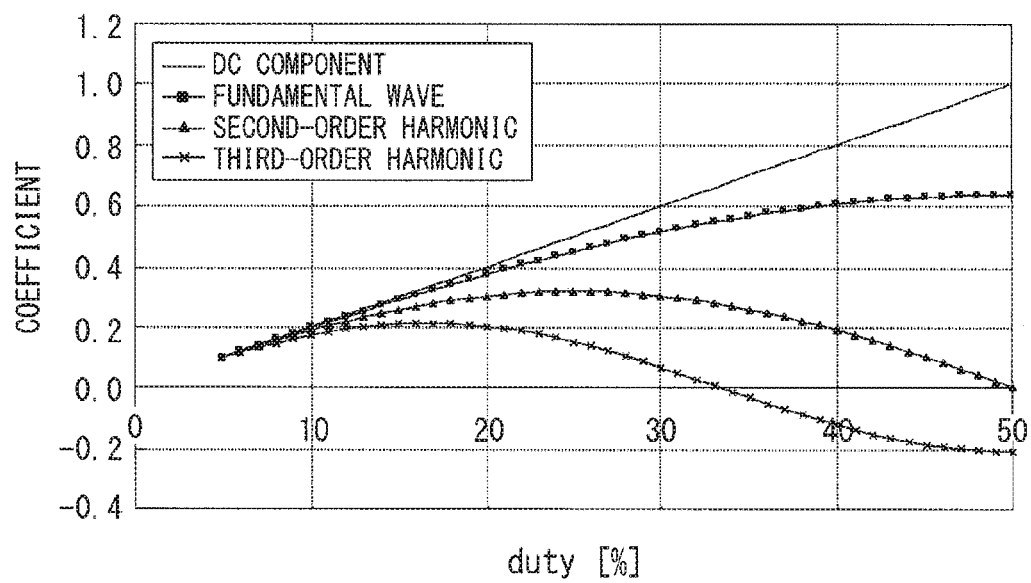
FIG. 6 is a diagram illustrating a relationship between a Fourier series expansion and a duty (No. 1)

Now, a description will be given of the coefficient of the Fourier series expansion when the duty of the light emission waveform is shortened. FIG. 5 illustrates a waveform when the duty of the light emission waveform is shortened without any increase in the peak value from a light emission waveform (311) having a duty of 50%. The duty of the light emission waveform (311) is 50% whereas the duty of the light emission waveform (301) is 25%. Since the peak value is not increased from the light emission waveform 311, when the light is emitted with the duty of 25%, the light emission power can be reduced more than the light emission waveform 311. In other words, when the duty is shortened from 50% to 25%, the light emission power can be suppressed to about half. A dependency of each coefficient of the Fourier series expansion in that case is illustrated in FIG. 6. In the light emission waveform (301), when the duty for obtaining the Fourier series expansion is expressed by d (0<d<1.0), an n-th harmonic is expressed as follows.

$$a_0 = 2d \quad (3-1)$$

$$a_n = 2 \sin(n\pi d)/n\pi (n=1,2,3,\ldots) \quad (3-2)$$

When the duty is shortened, an energy (amplitude value) of the fundamental wave component (first order component) is gently lowered, and the energy of the second-order harmonic component (second-order component) is gradually increased from "0" where the duty is 50%, and the energy of the third-order harmonic component (three-order component) is also gradually increased. In other words, if the high-order harmonic component can be effectively leveraged for the distance measurement, the efficiency of the energy can be enhanced.

Figure 7:
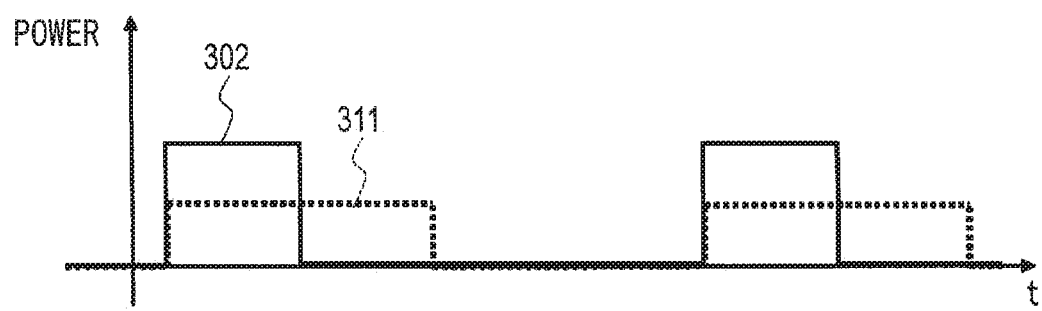
FIG. 7 is a diagram illustrating the light emission waveform (No. 2)
Figure 8:
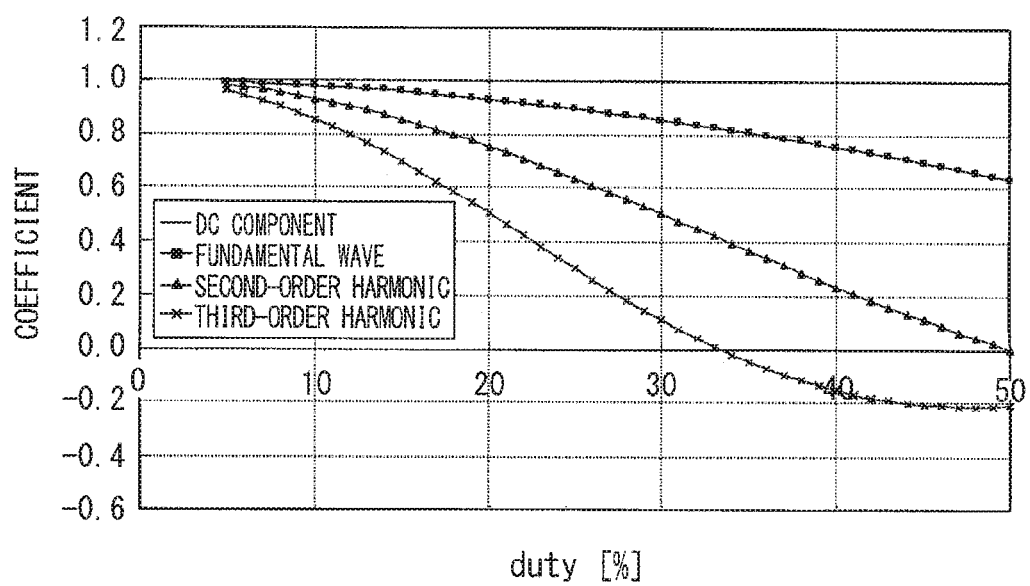
FIG. 8 is a diagram illustrating the relationship between the Fourier series expansion and the duty (No. 2)

FIG. 7 illustrates a waveform when the duty of the light emission waveform is shortened with an increase in the peak value from the light emission waveform (311) where the duty is 50%. The duty of the light emission waveform (302) is 25%. Since the peak value is substantially doubled from the light emission waveform (311) by a reduction of the duty from 50% to 25%, the light emission power is the same as the conventional one even when the light is emitted with the duty of 25%. A dependency of each coefficient of the Fourier series expansion in that case is illustrated in FIG. 8. In the light emission waveform (302), when the duty for obtaining the Fourier series expansion is expressed by d (0<d<1.0), an n-th harmonic is expressed as follows.

$$a_0 = (0.5/d) \times 2d = 1 \quad (4\text{-}1)$$

$$a_n = (0.5/d) \times (2\sin(n\pi d)/n\pi) \quad (4\text{-}2)$$
$$= 2d\sin(n\pi d)/n\pi$$
$$(n = 1, 2, 3, \ldots)$$

0.5 represents that the duty of the light emission waveform (311) is 50%.

When the duty is shortened, an energy of the DC component is kept constant (unchangeable), but the energy of the AC component is gradually increased. In other words, even when the peak value is increased as much as the duty of the light emission waveform is shortened, if not only the fundamental wave component but also the high-order harmonic component can be effectively leveraged in the distance measurement, the efficiency of the energy can be enhanced.

Figure 9:
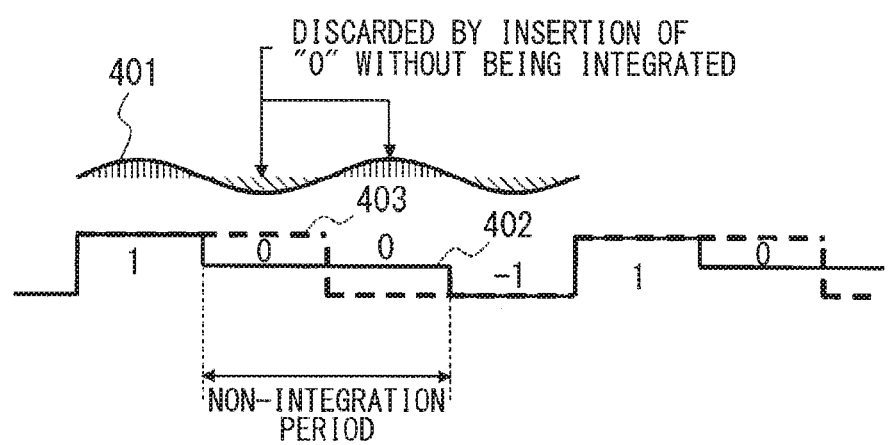
FIG. 9 is a diagram illustrating a waveform of a second-order harmonic and a non-integration period.
Figure 10:
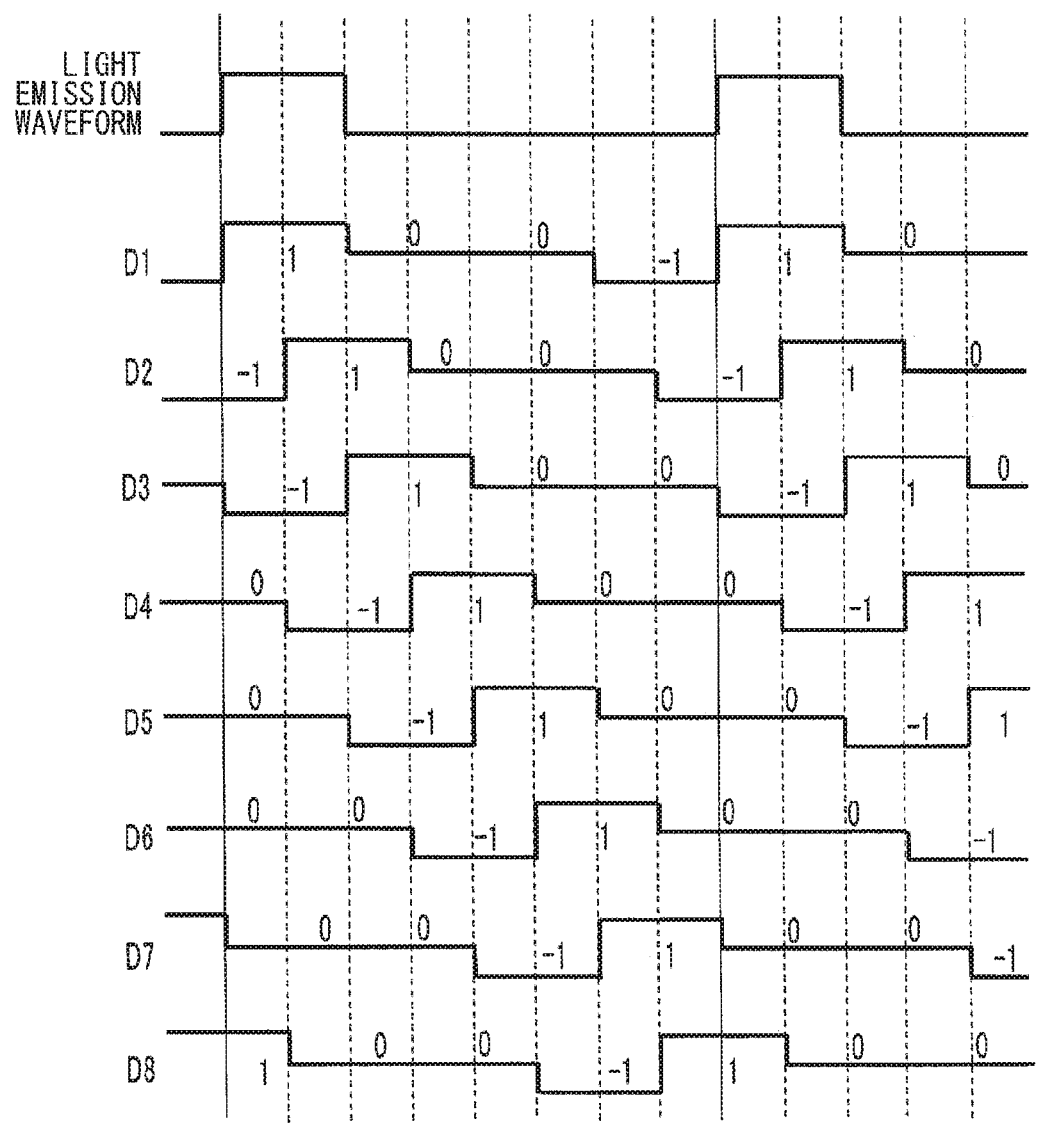
FIG. 10 is a diagram illustrating a sequence of eight phases when a duty of a light emission waveform is set to 25% (No. 1)

In the present disclosure, attention is paid to the above-mentioned relationship between the Fourier series expansion and the duty, and the control signals TG1 and TG2 for distributing the photoelectrons to the storage capacitors 14a and 14b in the light receiving element 6 are changed to enhance the sensitivity of the high-order harmonic. Specifically, as illustrated in FIG. 9, a non-integration period (a period in which the signal is discarded without being integrated) is inserted in the sequence of the differential output. FIG. 9 illustrates a case in which the sensitivity of the second-order harmonic (401) is enhanced, in which "O" (third state) that is the non-integration period is defined (inserted) in addition to "1" and "−1", and digital values (402) including "1", "−1", and "0" are provided. In other words, in a digital value (403) of the comparative example (only "1" and "−1" are provided, and "0" is not defined), in each of the period "1" and the period "−1", a positive component and a negative component cancel each other, as a result of which the sensitivity is not provided in the second-order harmonic component. However, with the definition of "0" which is the non-integration period, because a positive component is detected in the period "1", and a negative component is detected in the period "−1", the second-order harmonic component is restricted from being canceled. Incidentally, in the period "0", the positive component and the negative component cancel each other (are discarded). FIG. 10 illustrates an example of a sequence that defines "0" as described above, in which the non-integration period is provided and the drive is performed in eight phases when the duty of the light emission waveform is set to 25%. In more detail, the drive waveform is defined assuming that 0 to $\pi/2$ is the period "1", $\pi/2$ to $3\pi/2$ is the period "0", and the $3\pi/2$ to $2\pi$ is the period "−1".

Figure 11:
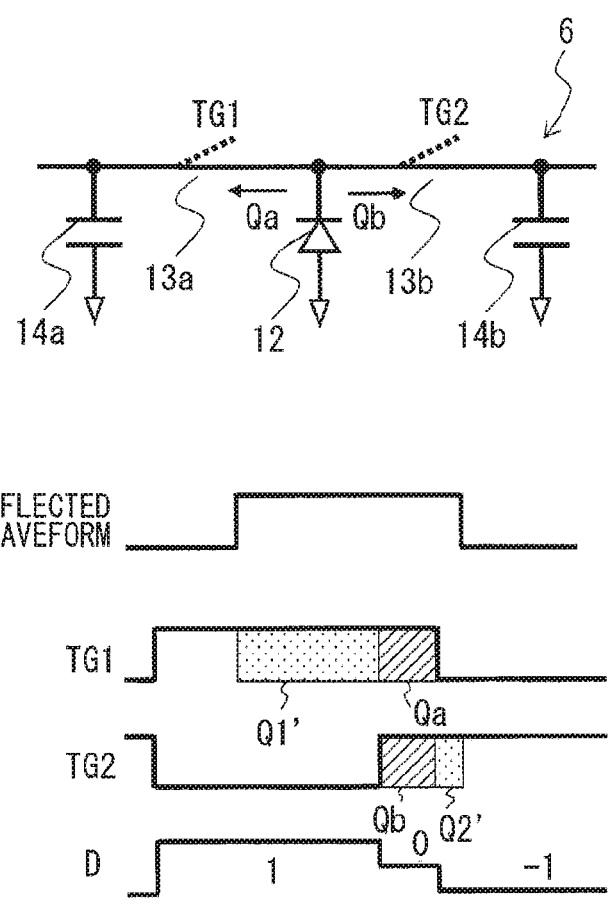
FIG. 11 is a diagram illustrating a configuration and a sequence realizing "0" (No. 1)

As methods for realizing "0", there are, for example, first to third methods described below. In the first method, as illustrated in FIG. 11, a period in which the modulation switches 13a and 13b turn on at the same time, that is, a period in which both of TG1 and TG2 become "H" is provided to realize "0". In a period where both of TG1 and TG2 become "H", charges generated in the PD 12 are divided into Qa and Qb and stored in the storage capacitors 14a and 14b, respectively, and Qa and Qb become the same value. For that reason, the component is canceled by the CM component removal circuit 7 and the differential detection circuit 9, as a result of which the AD conversion circuit 10 outputs "0".

Figure 12:
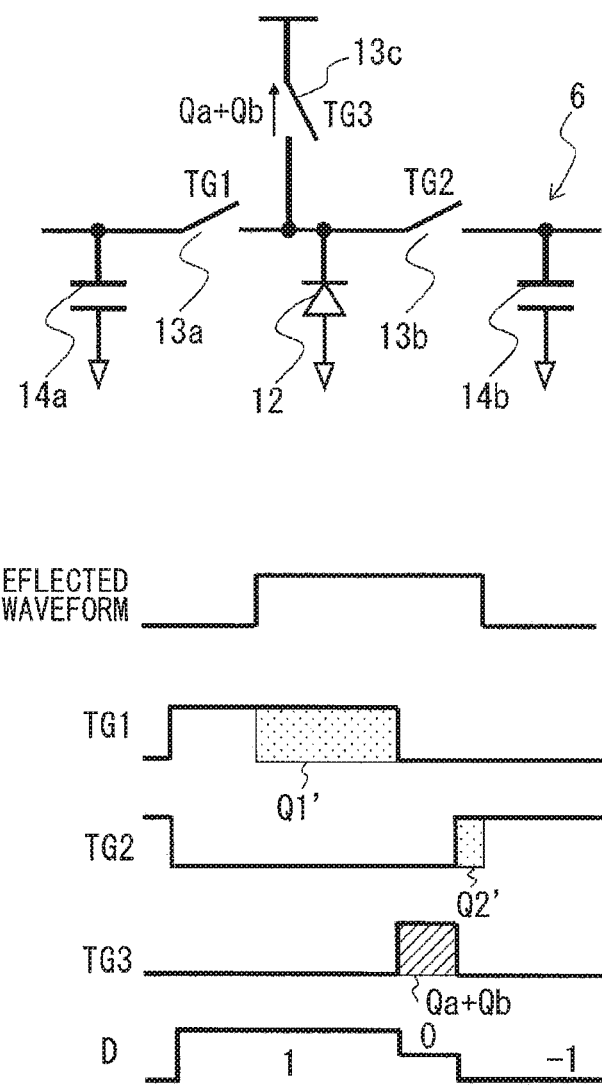
FIG. 12 is a diagram illustrating the configuration and the sequence realizing "0" (No. 2)

In the second method, as illustrated in FIG. 12, a discard switch 13c is provided aside from the modulation switches 13a and 13b, and a period in which the modulation switches 13a and 13b are turned off at the same time, and another discard switch 13c turns on, that is, a period in which both of the TG1 and the TG2 become "L", and the TG3 becomes "H" is provided to realize "0". In the period where both of the TG1 and the TG2 become "L", and the TG3 becomes "H", the charges generated in the PD 12 are discarded to a fixed potential (for example, VDD).

Figure 13:
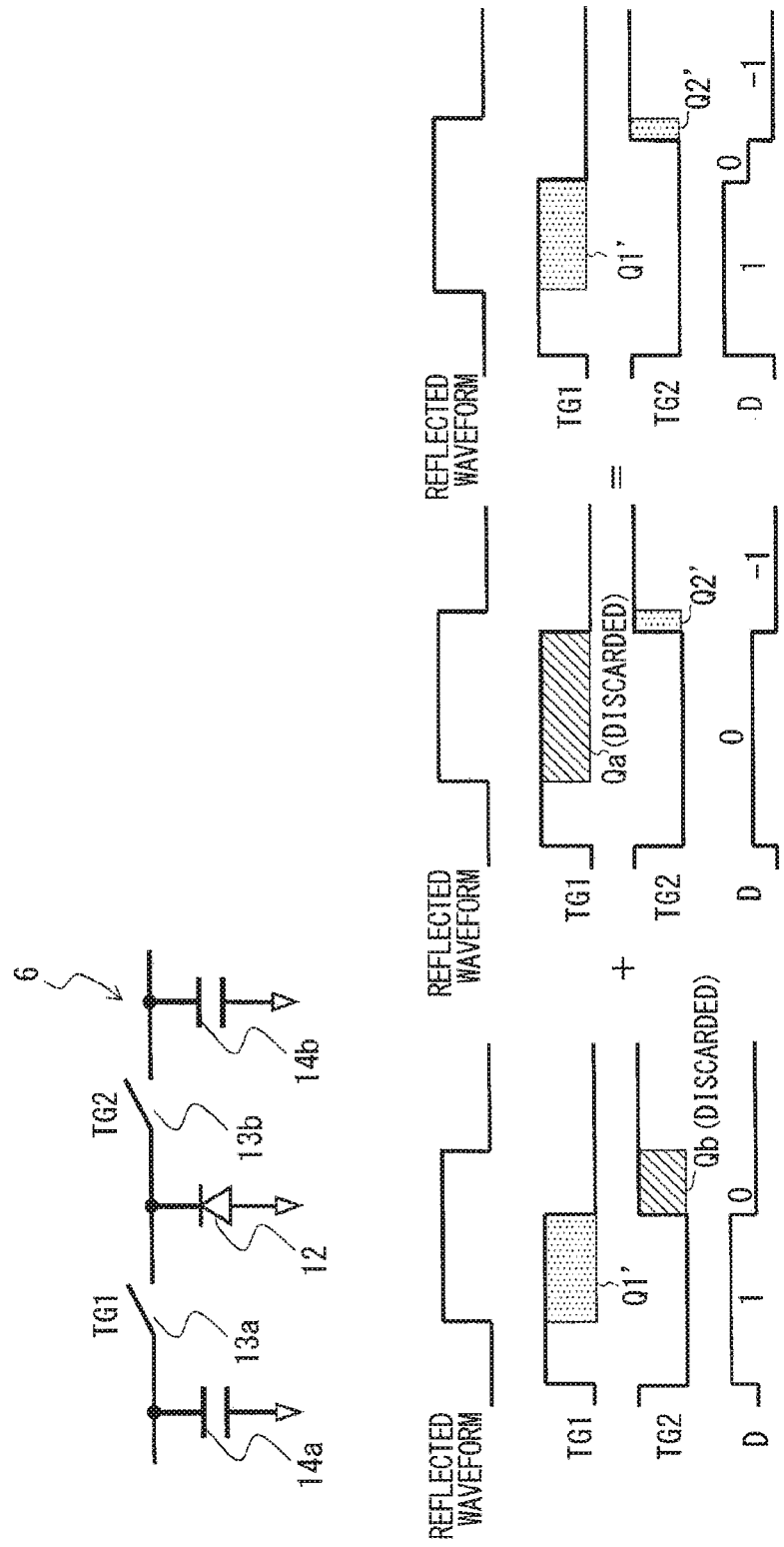
FIG. 13 is a diagram illustrating the configuration and the sequence realizing "0" (No. 3)

In the third method, as illustrated in FIG. 13, one of Qa and Qb is discarded, and two samples are integrated to realize "0". In other words, a cycle in which the charges stored in the period where the TG2 is "H" are discarded and a cycle in which the charges stored in the period where the TG1 is "H" are discarded are integrated together. In the first method described above, there is a need to provide the period in which both of the TG1 and the TG2 are set to "H", and in the second method, there is a need to provide the period in which both of the TG1 and the TG2 are set to "L". In the third method, there is no need to provide such periods, and a control for reversing the TG1 and the TG2 from each other may be performed, resulting in an advantage that the control is simple.

Figure 14:
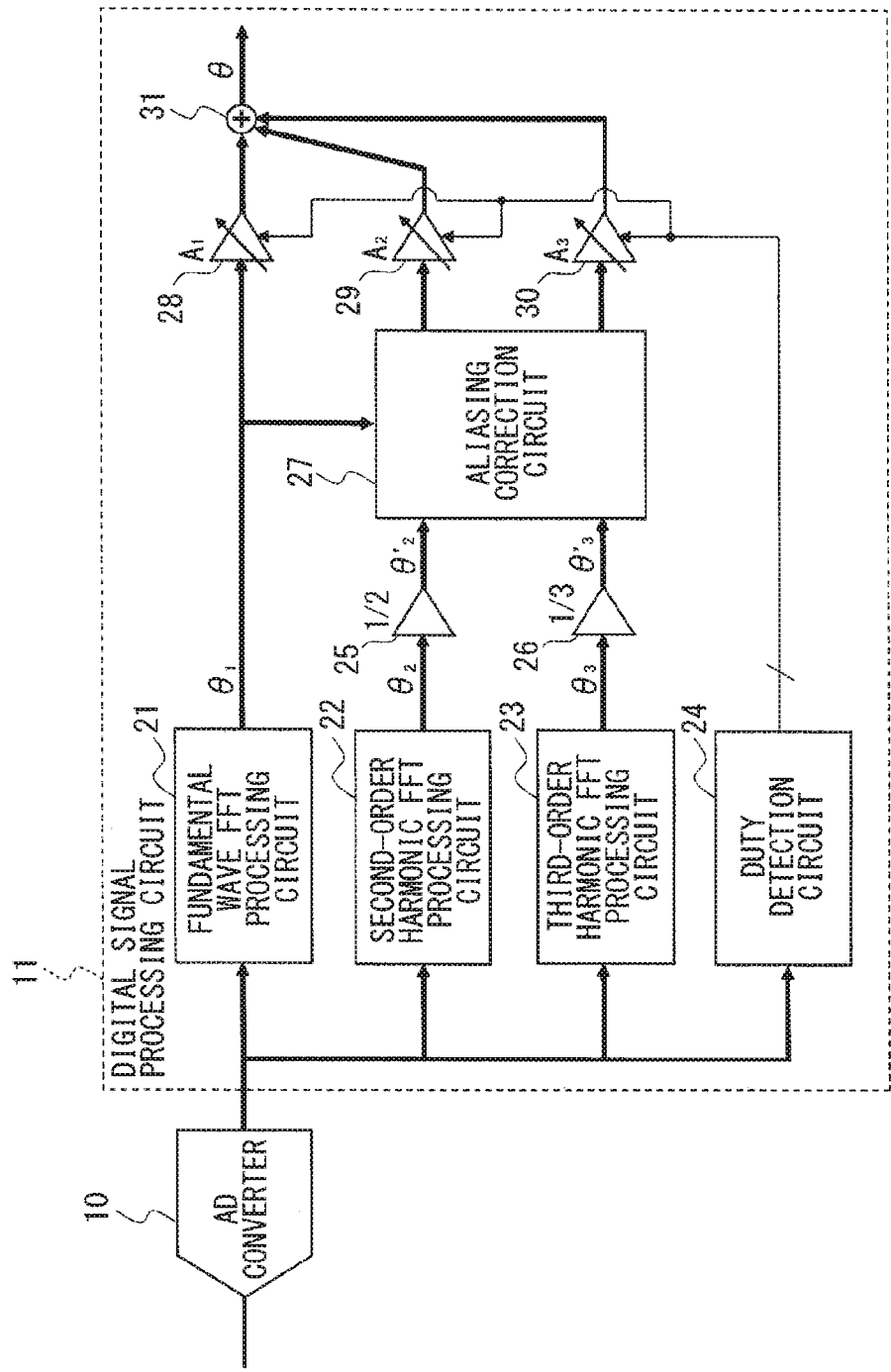
FIG. 14 is a diagram illustrating a configuration of a digital signal processing circuit.

The digital signal processing circuit 11 is configured as illustrated in FIG. 14. The digital signal processing circuit 11 includes a fundamental wave FFT (fast Fourier transform) processing circuit 21, a second-order harmonic FFT processing circuit 22, a third-order harmonic FFT processing circuit 23, a duty detection circuit 24, division circuits 25, 26, an aliasing correction circuit 27, gain variable circuits 28 to 30, and an addition circuit 31.

The fundamental wave FFT processing circuit 21 outputs a phase angle standard deviation $\sigma\theta_1$ of the fundamental wave to the gain variable circuit 28. The second-order harmonic FFT processing circuit 22 outputs a phase angle standard deviation $\sigma\theta_2$ of the second-order harmonic to the division circuit 25. The third-order harmonic FFT processing circuit 23 outputs a phase angle standard deviation $\sigma\theta_3$ of the third-order harmonic to the division circuit 26. The duty detection circuit 24 detects a duty of the light emission waveform, and outputs the detection result to the gain variable circuits 28 to 30. Upon receiving the phase angle standard deviation $\sigma\theta_2$ from the second-order harmonic FFT processing circuit 22, the division circuit 25 outputs a value $\theta_2'$ of ½ (fixed gain) of the phase angle standard deviation $\sigma\theta_2$ to the aliasing correction circuit 27. Upon receiving the phase angle standard deviation $\sigma\theta_3$ from the third-order harmonic FFT processing circuit 23, the division circuit 26 outputs a value $\theta_3'$ of ⅓ (fixed gain) of the phase angle standard deviation $\sigma\theta_3$ to the aliasing correction circuit 27. Upon receiving $\theta_2'$ and $\theta_3'$ from the respective division circuits 25 and 26, the aliasing correction circuit 27 subjects $\theta_2'$ and $\theta_3'$ to the aliasing correction, and outputs the corrected $\theta_2'$ and $\theta_3'$ to the gain variable circuits 29 and 30. The gain variable circuits 28 to 30 multiplies the phase angle standard deviation $\sigma\theta_1$ of the fundamental wave, the phase angle standard deviation $\sigma\theta_2'$ of the second-order harmonic, and the phase angle standard deviation $\sigma\theta_3'$ of the third-order harmonic by coefficients ($A_1$ to $A_3$) for weighting, respectively, and output the weighted phase angle standard deviations to the addition circuit 31. The addition circuit 31 adds the phase angle standard deviation $\sigma\theta_1$ of the fundamental wave, the phase angle standard deviation $\sigma\theta_2'$ of the second-order harmonic, and the phase angle standard deviation σθ$_3$' of the third-order harmonic, which have been weighted by the respective coefficients, and calculates and outputs the phase angle standard deviation σθ.

A case in which the digital signal processing circuit 11 weights and adds the fundamental wave and the second-order harmonic will be described. The digital signal processing circuit 11 calculates a measured distance value d$_1$ from the fundamental wave through the following arithmetic expression.

$$d_1 = (1/2)(c/f_m)(\theta_1/2\pi) \tag{5}$$

In addition, the digital signal processing circuit 11 calculates a measured distance value d$_2$ from the second-order harmonic through the following arithmetic expression.

$$d_2 = (1/2)(c/2f_m)(\theta_2/2\pi) \tag{6}$$
$$= (1/2)(c/f_m)(\theta_2/2/2\pi)$$
$$= (1/2)(c/f_m)(\theta_2'/2\pi)$$

The digital signal processing circuit 11 weights and adds the measured distance values d$_1$ and d$_2$ with coefficients of A$_1$ and A$_2$, and calculates a measured distance value d through the following arithmetic expression.

$$d = A_1 d_1 + A_2 d_2 \tag{7}$$
$$= (1/2)(c/f_m)(1/2\pi)(A_1\theta_1 + A_2\theta_2')$$
$$= (1/2)(c/f_m)(\theta/2\pi)$$

In this example, during the distance measuring period of the present disclosure, since f$_m$ is unchangeable, the phase angle θ added with A$_1$θ$_1$+A$_2$θ$_2$' is defined, and compared with the comparative example, as a result of which the performance of the time-of-flight distance measurement device 1 according to the present disclosure can be quantitatively evaluated. In this example, A$_1$ and A$_2$ are determined, for example, so that the phase angle standard deviation σθ becomes minimum. If the transmission gain is found in each of the fundamental wave and the second-order harmonic, how the error is transferred to θ$_1$ and θ$_2$' when noise is superimposed on the sample value can be calculated. Hence, if a ratio of those transmission gains is found, appropriate A1 and A2 can be calculated. Incidentally, the ratio of the transmission gains is a function of the light emission waveform (duty ratio), the drive waveform of the light receiving element 6, and the number of phases, and is a function of the duty ratio when the driving manner of the light receiving element 6 is unchangeable.

In the sequence where the drive is performed in eight phases when the duty of the light emission waveform is set to 25%, the following values are appropriate values.

$$A1=0.3, A_2=0.7 \tag{8}$$

Hence, the following expressions are obtained.

$$\theta = 0.3\theta_1 + 0.7\theta_2' \tag{9}$$

$$d = 0.3d_1 + 0.7d_2 \tag{10}$$

Figure 15:
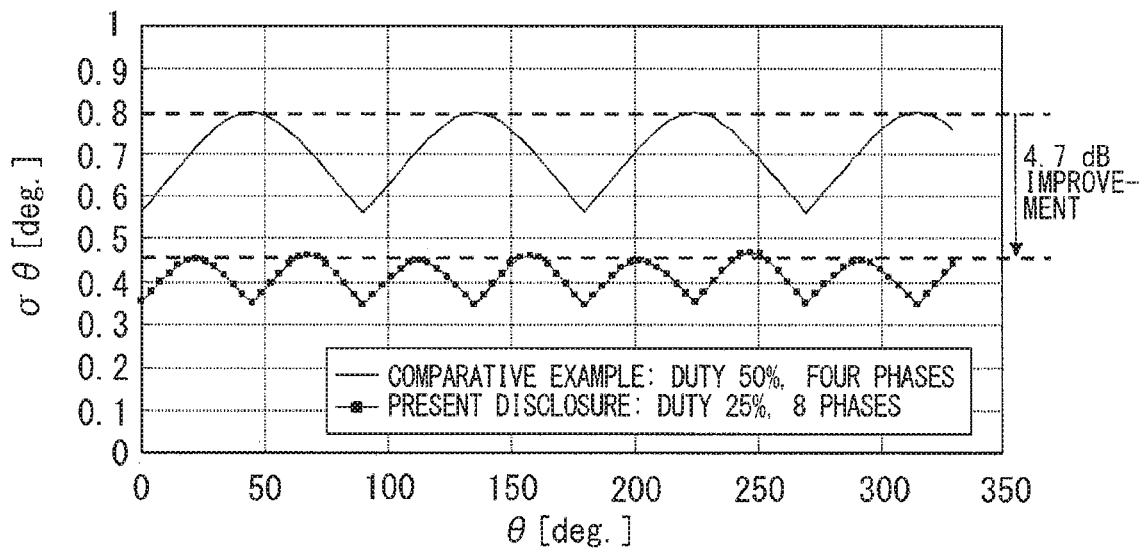
FIG. 15 is a diagram illustrating a comparison of a phase angle standard deviation (No. 1)

FIG. 15 illustrates a simulation result of the phase angle standard deviation σθ in a sequence where the drive is performed in eight phases when the peak value is twice as large as that in the comparative example with the duty of the light emission waveform set as 25%. In the comparative example of the sequence in which the drive is performed in four phases with the duty of the light emission waveform set as 50%, if the peak value is twice as large as that in the comparative example under the condition where the light emission power is kept constant without changing the duty and the number of phases, the signal component is doubled, and the noise component becomes √2 times. Therefore, an improved range of the distance error from the comparative example is 3 dB. On the contrary, the improved range of the distance error from the comparative example in the present disclosure is about 4.7 dB, and the improved range of the distance error from the comparative example is excellent by about 1.7 dB.

Figure 16:
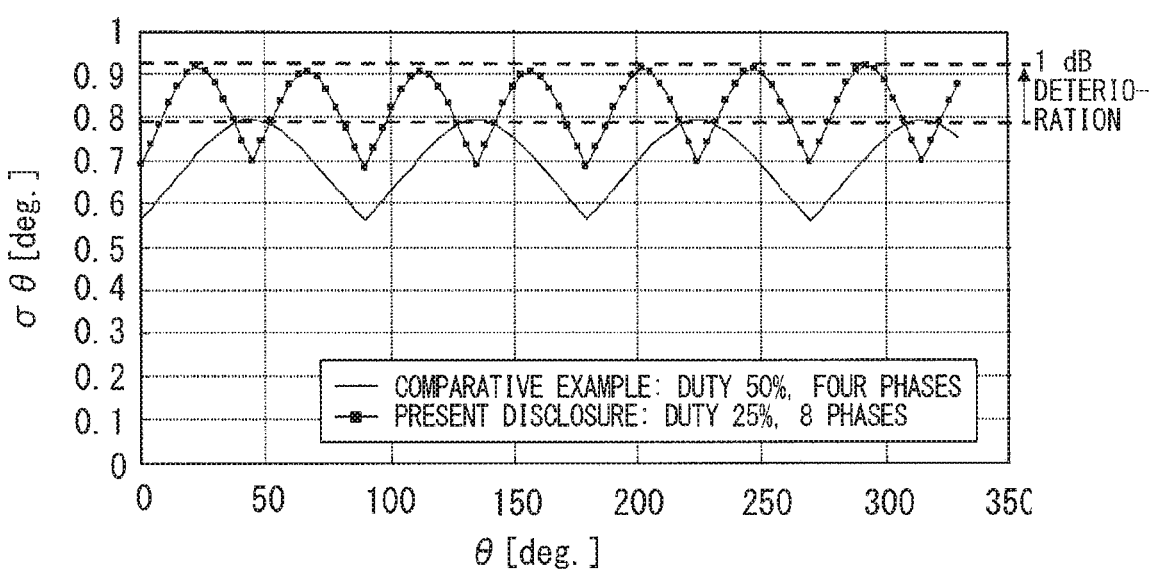
FIG. 16 is a diagram illustrating the comparison of the phase angle standard deviation (No. 2)

FIG. 16 illustrates a simulation result of the phase angle standard deviation σθ in a sequence where the drive is performed in eight phases without changing the peak value from the conventional value with the duty of the light emission waveform set as 25%. In that case, although the light emission power is suppressed to about half of the comparative example, the deterioration of the distance error from the comparative example is suppressed to about 1 dB.

Figures 17, 18:
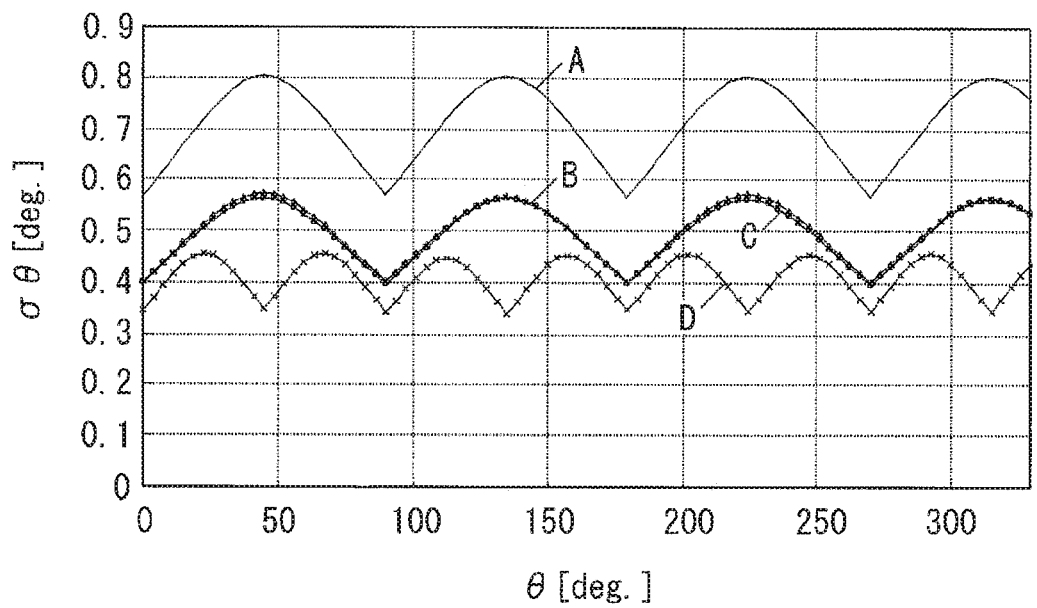
FIG. 17 is a diagram illustrating the comparison of the phase angle standard deviation (No. 3)
FIG. 18 is a diagram illustrating conditions.

FIGS. 17 and 18 illustrate the simulation result of the phase angle standard deviation σθ when changing the duty of the light emission waveform, the peak value, the number of phases, the drive waveform (digital value), and the integration period, under the conditions where the light emission power is the same with the inclusion of the above comparative example. As in the present disclosure, it is found that the fundamental wave and the high-order harmonic are weighted and added with the provision of the non-integration period (including "0"), thereby being capable of reducing the distance error even in the condition where the light emission power is the same. In other words, it is found that the distance error can be reduced without any increase in the light emission power from the comparative example.

Figure 19:
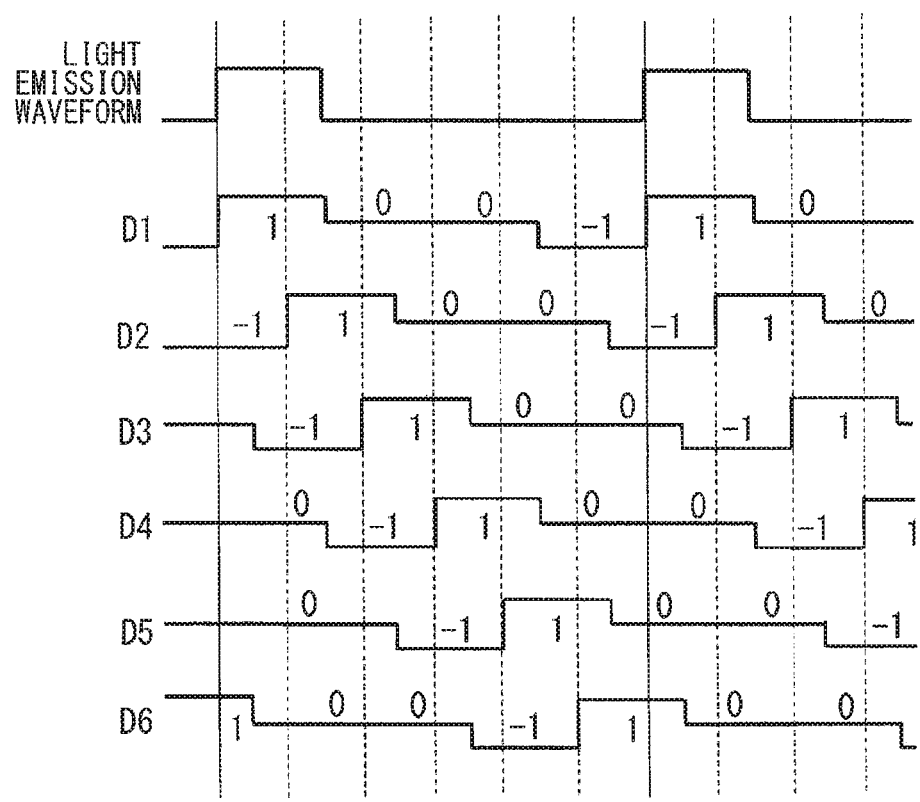
FIG. 19 is a diagram illustrating a sequence of six phases when the duty of the light emission waveform is set to 25%.
Figure 20:
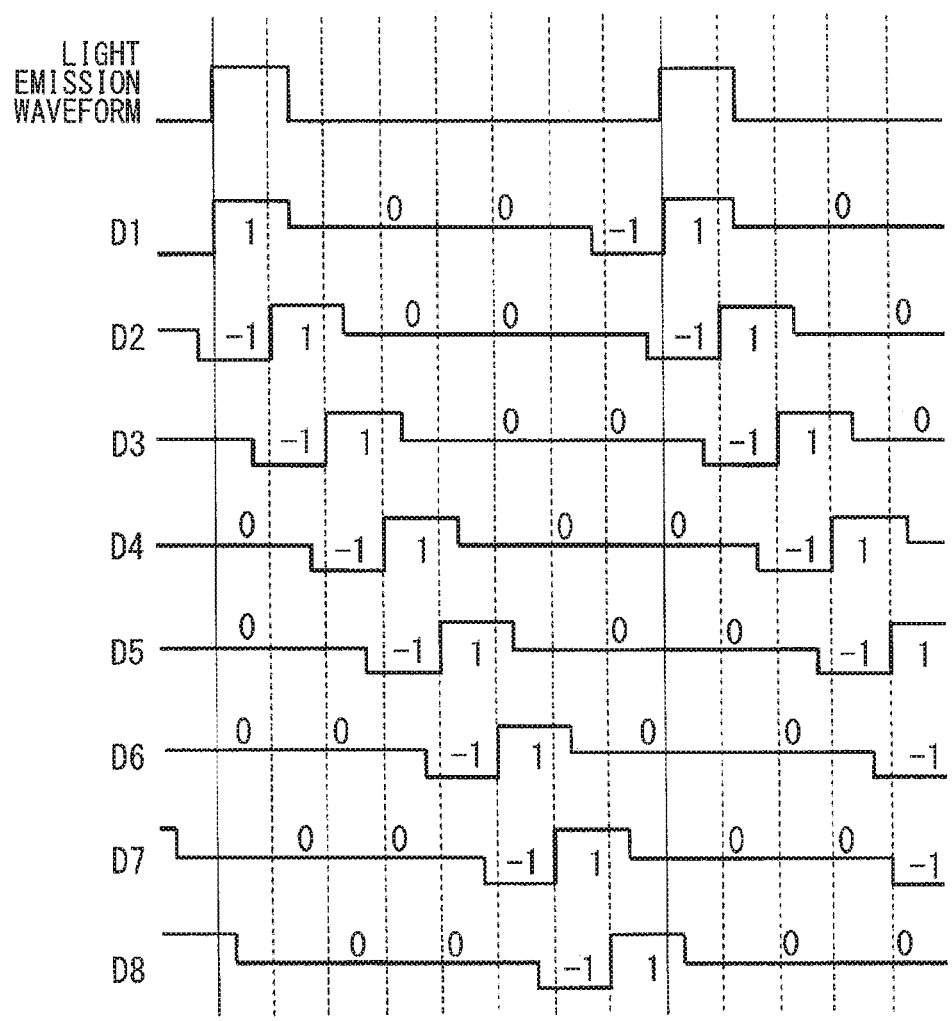
FIG. 20 is a diagram illustrating a sequence of eight phases when the duty of the light emission waveform is set to 17% (No. 1)

Incidentally, the sequence in which the drive is performed in eight phases with the duty of the light emission waveform set as 25%, but the number of phases may be changed. When the drive is performed in sixth phases with the duty of the light emission waveform set as 25%, a sequence illustrated in FIG. 19 is obtained. In addition, when the drive is performed in eight phases with the duty of the light emission waveform set as 17%, and the sensitivity of the third-order harmonic is enhanced, a sequence illustrated in FIG. 20 is obtained. In that case, in four phases, twelve exposures in total are required in correspondence with the fundamental wave, the second-order harmonic, and the third-order harmonic. On the other hand, in the present disclosure, only eight exposures are performed.

Figure 21:
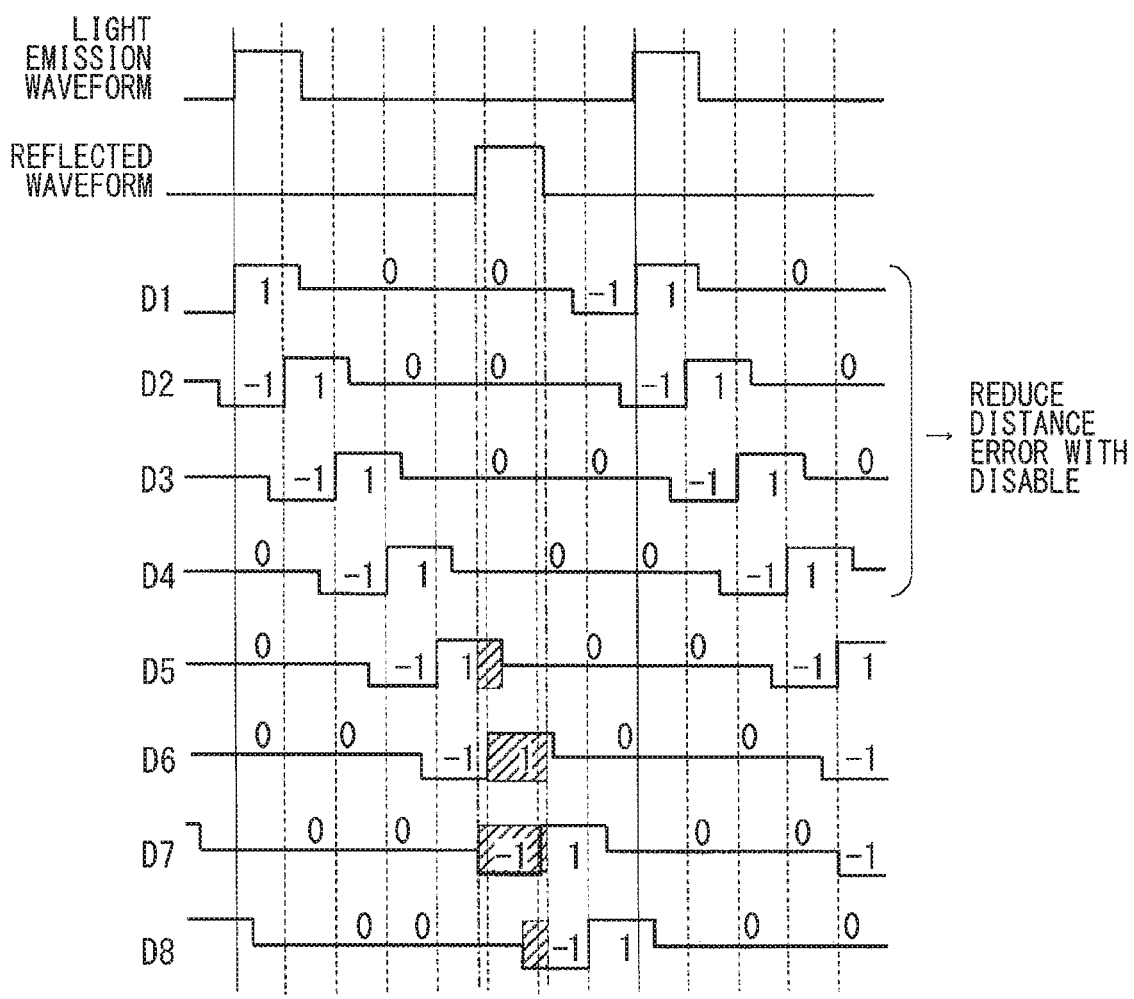
FIG. 21 is a diagram illustrating a sequence of the eight phases when the duty of the light emission waveform is set to 17% (No. 2)

In addition, as illustrated in FIG. 21, among the values sampled by the light receiving element 6, values in which the integration period and the time axis match each other (overlap with each other) may be enabled, and values in which the integration period and the time axis do not match each other may be disabled. In other words, in the sequence where the drive is performed in eight phases with the duty of the light emission waveform set as 17%, in an illustration of FIG. 21, since the digital values D1 to D4 merely acquire the noise component, the digital values D1 to D4 are disabled, thereby being capable of reducing the distance error. The reason is because since in the digital values D1 to D4, the reflected waveforms do not overlap with each other in the period of "1" or "−1", the components other than the CM component are not stored in the capacitor.

Figure 22:
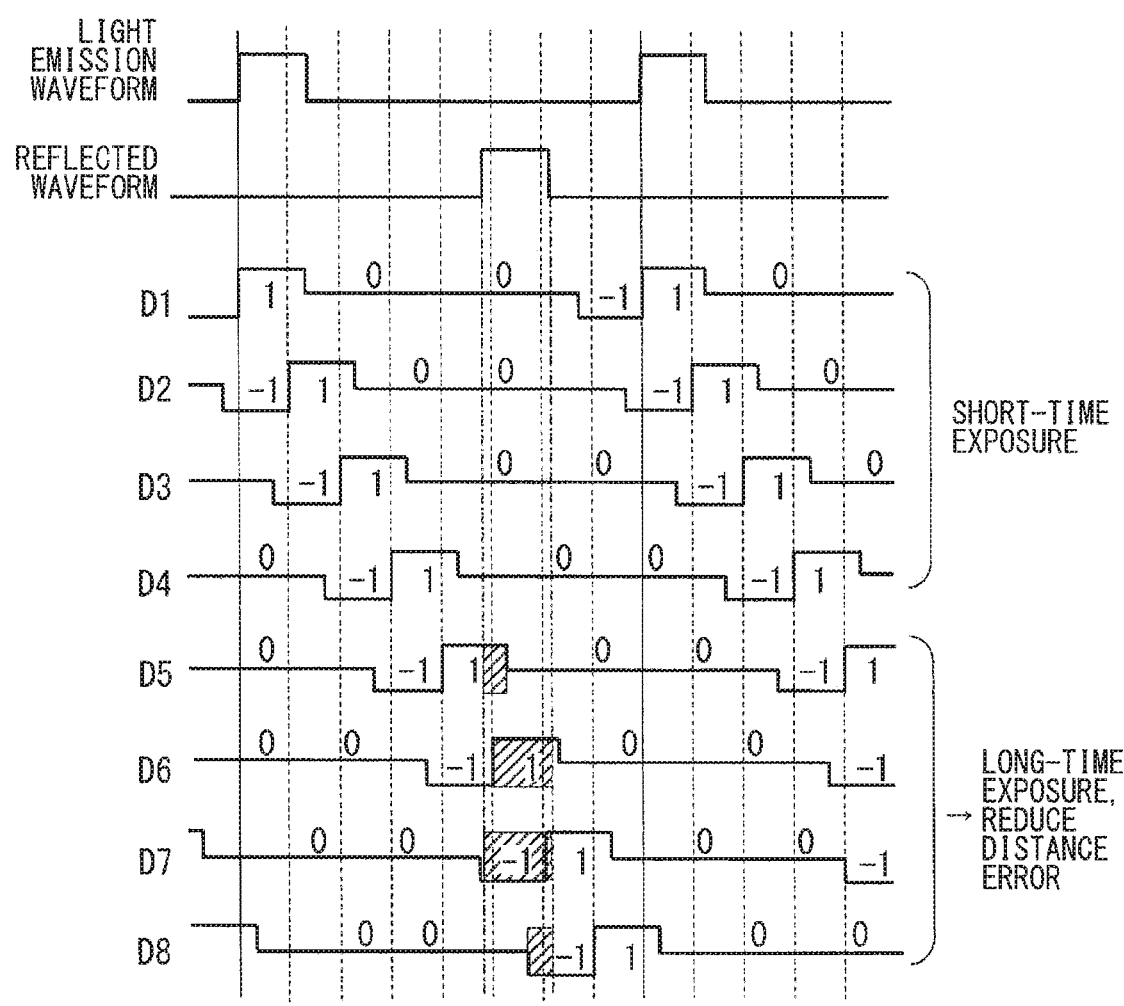
FIG. 22 is a diagram illustrating a sequence of the eight phases when the duty of the light emission waveform is set to 17% (No. 3)
Figure 23:
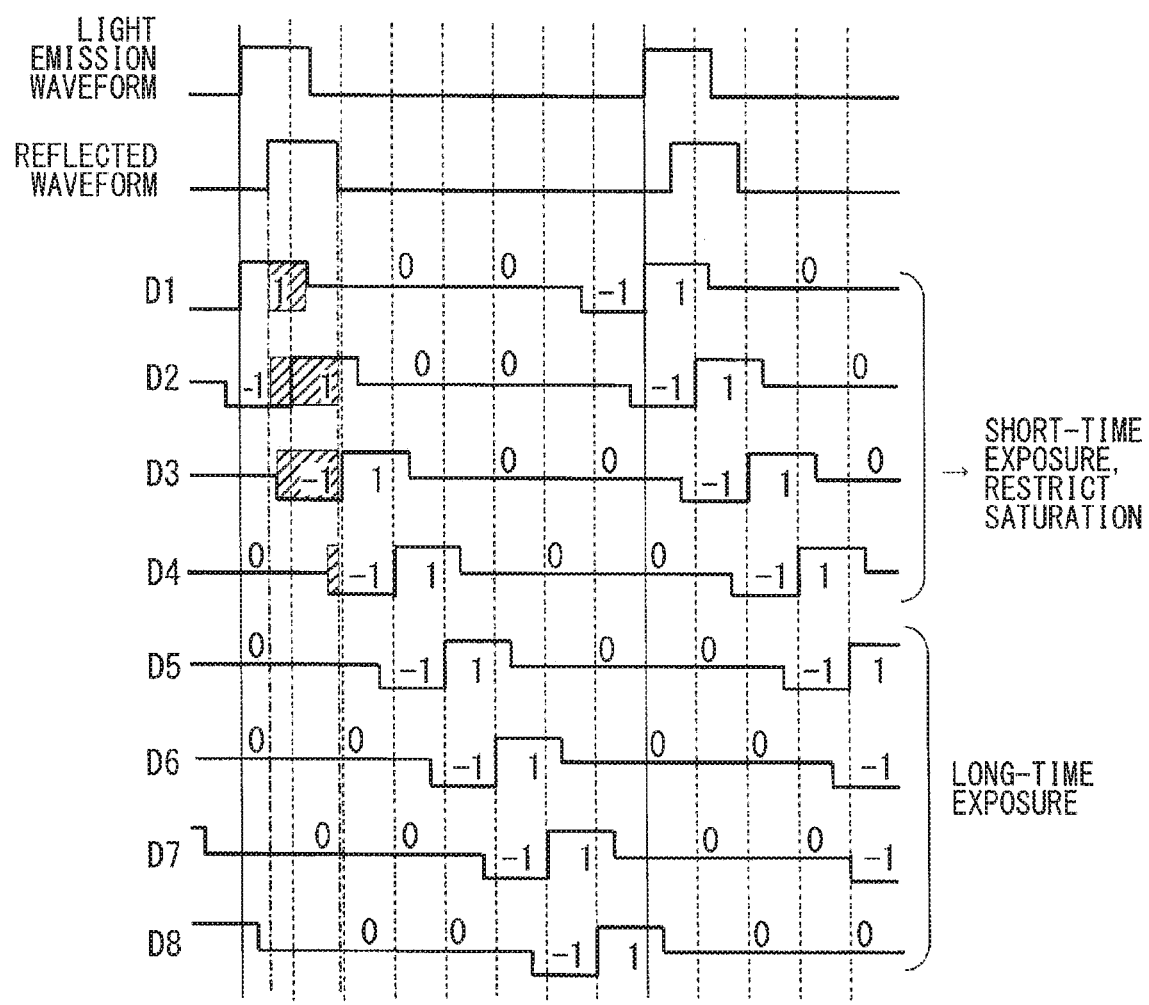
FIG. 23 is a diagram illustrating a sequence of the eight phases when the duty of the light emission waveform is set to 17% (No. 4).

In addition, as illustrated in FIG. 22, when the distance from the subject device to the object is relatively long, the exposure period of the light receiving element 6 is controlled to be relatively long so that the number of samplings in which the integration period and the time axis match each other becomes relatively large, thereby being capable of reducing the distance error. In other words, in an illustration of FIG. 22, the distance error can be reduced with the digital values D1 to D4 as a short-time exposure and the digital values D5 to D8 as a long-time exposure. In contrast, when the distance from the subject device to the object is relatively short, the exposure period of the light receiving element 6 is controlled to be relatively short so that the number of samplings in which the integration period and the time axis match each other becomes relatively small, thereby being capable of restricting the saturation. In other words, in an illustration of FIG. 23, the saturation can be restricted with the digital values D1 to D4 as a short-time exposure and the digital values D5 to D8 as a long-time exposure.

According to the time-of-flight distance measurement device 1 and the time-of-flight distance measurement method according to the present embodiment described above, the following advantages can be obtained. In the time-of-flight distance measurement device 1, with the leverage of a phenomenon that when the duty of the light emission waveform is set to be shorter than 50%, the energy of the high-order harmonic component is increased more as the duty is shorter, the duty of the light emission waveform is set to be shorter than 50%, the exposure of the light receiving element 6 is controlled so that the sensitivity is given to a predetermined high-order harmonic, and the fundamental wave component and the high-order harmonic component are linearly coupled with each other. As a result, the distance error can be appropriately reduced more than a case in which the distance is calculated on the basis of only the component of the fundamental wave as much as the consideration of the high-order harmonic component. In that case, there is no need to increase the light emission power in order to increase the signal component, there is no need to use an optical filter in order to reduce a noise component, there is no need to increase the number of integrations, and there is no need to increase the modulation frequency. In other words, the distance error can be appropriately reduced without increasing the light emission power, using the optical filter, increasing the number of integrations, and increasing the modulation frequency.

In that case, the peak value is increased as large as the duty of the light emission waveform is shorter than 50%, thereby capable of reducing the distance error while maintaining the same light emission power as that of the conventional art. In addition, even if the peak value is not increased by merely setting the duty of the light emission waveform to be smaller than 50%, the same distance precision as that in the conventional art can be maintained. In addition, among the values sampled by the light receiving element 6, values in which the integration period and the time axis match each other (overlap with each other) are enabled, and values in which the integration period and the time axis do not match each other are disabled, thereby being capable of reducing the distance error. In addition, when the distance from the subject device to the object is relatively long, the exposure period of the light receiving element 6 is controlled to be relatively long so that the number of samplings becomes relatively large, thereby being capable of reducing the distance error. In contrast, when the distance from the subject device to the object is relatively short, the exposure period of the light receiving element 6 is controlled to be relatively short so that the number of samplings becomes relatively small, thereby being capable of restricting the saturation.

The present disclosure is not limited to only the above embodiments, but can be modified or expanded as follows.

In the embodiment described above, the duty of the light emission waveform is set to be smaller than 50%, to thereby increase the energy of at least one high-order harmonic. However, there is no need to always set the duty of the light emission waveform to be smaller than 50%. For example, a case in which the duty is not restricted from becoming larger than 50% in the circumstances of the circuit for driving the light emitting element is conceivable. More specifically, it is assumed that the duty is hardly set to be smaller than 50%, and an adjustment mechanism is hardly provided, under the circumstances where the threshold is too low, the waveform of the driving circuit is dull, and the like. Even when the duty becomes larger than 50%, an absolute value of the component of the high-order harmonic becomes larger than 0. Therefore, even when the duty must be set to be larger than 50%, the light receiving element is controlled so that the sensitivity is given to the above high-order harmonic, thereby being effectively leveraging the high-order harmonic. For example, when a secondary component is used as the high-order harmonic, if the duty is set to 75%, the secondary component can be most effectively used.

The time-of-flight distance measurement device and the time-of-flight distance measurement method according to the present disclosure may be used for purposes other than the vehicle. In addition, in the above embodiment, the duty of the light emission waveform is set to 25% or 17%, but may be shortened to another value. Further, the case in which the peak value of the light emission waveform is doubled is exemplified, but the peak value may be increased to another multiple number.

The invention claimed is:

1. A time-of-flight distance measurement device comprising:
a light emitting element configured to emit a modulated light modulated in a pattern having a repetitive period toward a space;
a driving unit configured to set a duty of a light emission waveform to be shorter than 50% and to drive the light emitting element at the duty;
a light receiving element configured to distribute charges of photoelectron generated corresponding to an incident light containing a reflected light obtained by reflecting the modulated light on an object to a plurality of storage capacitors and to store, as a charge amount of the photoelectron, the distributed charges;
a control unit configured to discard the charges generated according to the incident light without integrating the charges to control an exposure of the light receiving element; and
a signal processing unit configured to measure a distance to the object by using a value sampled by the light receiving element, wherein
the control unit is configured to control the exposure of the light receiving element to give a sensitivity to at least one high-order harmonic, and
the signal processing unit is configured to linearly combine a component of a fundamental wave with a component of the at least one high-order harmonic to measure the distance to the object.

2. The time-of-flight distance measurement device according to claim 1, wherein the driving unit is configured to increase a peak value of the light emission waveform comparable to the duty of the light emission waveform set to be shorter than 50%.

3. The time-of-flight distance measurement device according to claim 1, wherein
the plurality of storage capacitors includes two storage capacitors,
the light receiving element includes the two storage capacitors and two modulation switches corresponding to the respective two storage capacitors, and
the control unit is configured to control the two modulation switches to allow a third state, in which the charges generated according to the incident light are discarded without being integrated, between a first state, in which a control signal for driving one of the two modulation switches is H and in which a control signal for driving the other modulation switch is L, and a second state in which the control signal for driving one modulation switch is L and in which the control signal for driving the other modulation switch is H, and to give the sensitivity to the component of the at least one high-order harmonic.

4. The time-of-flight distance measurement device according to claim 3, wherein
the control unit is configured to provide a state in which the control signals for driving the respective two modulation switches are H to allow the third state to occur.

5. The time-of-flight distance measurement device according to claim 3, wherein
the light receiving element includes a discard switch, and
the control unit is configured to provide a state, in which the control signals for driving the respective two modulation switches are L and in which a control signal for driving the discard switch is H, to allow the third state to occur.

6. The time-of-flight distance measurement device according to claim 3, wherein
the control unit is configured to invert the control signals for driving the respective two modulation switches under control and to integrate a period, in which the charges stored in one of the two storage capacitors are discarded, with a period, in which the charges stored in the other of the two storage capacitors are discarded, to allow the third state to occur.

7. The time-of-flight distance measurement device according to claim 1, wherein
the signal processing unit is configured to allocate a fixed gain of 1/n to an n-order harmonic component before the signal processing unit linearly combines the fundamental wave component with the at least one high-order harmonic component, wherein n is a natural number.

8. The time-of-flight distance measurement device according to claim 1, wherein
the signal processing unit is configured to estimate the duty of the light emission waveform from the value sampled by the light receiving element.

9. The time-of-flight distance measurement device according to claim 8, wherein
the signal processing unit is configured to determine a coefficient to linearly combine the fundamental wave component with the at least one high-order harmonic component from the duty of the estimated light emission waveform.

10. The time-of-flight distance measurement device according to claim 9, wherein
the signal processing unit is configured to determine a phase rotation from the fundamental wave component to the at least one high-order harmonic component and to correct the coefficient.

11. The time-of-flight distance measurement device according to claim 9, wherein
the signal processing unit is configured to linearly combine the fundamental wave component with a second-order harmonic component at a ratio of 3:7.

12. The time-of-flight distance measurement device according to claim 11, wherein
the signal processing unit is configured to linearly combine the fundamental wave component with the second-order harmonic component at a ratio of 3:7 when a number of phases of a drive signal for the light emitting element is one of six phases and eight phases.

13. The time-of-flight distance measurement device according to claim 1, wherein
the signal processing unit is configured to enable a value, in which an integration period and a time axis match each other among the values sampled by the light receiving element, to disable a value, in which the integration period and the time axis do not match each other, and to calculate the distance from a subject device to the object.

14. The time-of-flight distance measurement device according to claim 1, wherein
the control unit is configured to control an exposure period of the light receiving element to be relatively long to relatively increase a number of samplings in which an integration period and a time axis match each other when the distance to the object is relatively long, and to control the exposure period of the light receiving element to be relatively short to relatively decrease the number of samplings in which the integration period and the time axis match each other when the distance to the object is relatively short.

15. The time-of-flight distance measurement device according to claim 1, wherein
the control unit is configured to discard the charges without integrating the charges in every sequence during the measurement of the distance to the object.

16. A time-of-flight distance measurement method for calculating a distance to an object, comprising:
causing a light emitting element to emit a modulated light modulated in a pattern having a repetitive period toward a space;
setting a duty of a light emission waveform to be shorter than 50%;
driving the light emitting element at the duty;
controlling an exposure of the light receiving element by discarding the charges, which is generated according to an incident light, without integrating the charges to give a sensitivity to at least one high-order harmonic, distributing charges of photoelectron generated correspondingly to an incident light containing a reflected light obtained by reflecting the modulated light on an object to a plurality of storage capacitors of the light receiving element, and storing, as a charge amount of the photoelectron, the distributed charges; and
linearly combining a component of a fundamental wave sampled by the light receiving element with a component of the at least one high-order harmonic to measure the distance to the object.

17. The time-of-flight distance measurement method according to claim 16, wherein a peak value of the light emission waveform is increased comparable to the duty of the light emission waveform set to be shorter than 50%.

18. The time-of-flight distance measurement method according to claim 16, wherein
the light receiving element includes two storage capacitors and two modulation switches corresponding to the respective two storage capacitors, and
the two modulation switches are controlled to allow a third state, in which the charges generated according to the incident light are discarded or stored without being integrated, between a first state, in which a control signal for driving one of the two modulation switches is H and in which a control signal for driving the other modulation switch is L, and a second state, in which the control signal for driving one modulation switch is L and in which the control signal for driving the other modulation switch is H, and to give the sensitivity to the component of the at least one high-order harmonic.

19. A time-of-flight distance measurement device comprising:
a light emitting element configured to emit a modulated light modulated in a pattern having a repetitive period toward a space;
a driving unit configured to drive the light emitting element;
a light receiving element configured to distribute charges corresponding to an incident light containing a reflected light obtained by reflecting the modulated light on an object to a plurality of storage capacitors and to store the distributed charges;
a control unit configured to control an exposure of the light receiving element; and
a signal processing unit configured to measure a distance to the object by using a value sampled by the light receiving element, wherein
the control unit is configured to control the exposure of the light receiving element to give a sensitivity to at least one high-order harmonic,
the signal processing unit is configured to linearly combine a component of a fundamental wave with a component of the at least one high-order harmonic to measure the distance to the object,
the driving unit is configured to drive the light emitting element to set a duty of a light emission waveform to be shorter than 50%,
the light receiving element includes two storage capacitors and two modulation switches corresponding to the respective two storage capacitors, and
the control unit is configured to control the two modulation switches to allow a third state, in which the charges generated according to the incident light are discarded without being integrated or stored without being integrated, between a first state, in which a control signal for driving one of the two modulation switches is H and in which a control signal for driving the other modulation switch is L, and a second state in which the control signal for driving one modulation switch is L and in which the control signal for driving the other modulation switch is H, and to give the sensitivity to the component of the at least one high-order harmonic.

20. The time-of-flight distance measurement device according to claim 19, wherein
the control unit is configured to discard the charges without integrating the charges in every sequence during the measurement of the distance to the object.

* * * * *